United States Patent [19]

Schmid et al.

[11] 4,099,792
[45] Jul. 11, 1978

[54] BRAKE FORCE CONTROLLER FOR VEHICLES, PARTICULARLY AUTOMOTIVE VEHICLES

[75] Inventors: Walter Schmid, Maichingen; Arno Jambor, Vaihingen, both of Fed. Rep. of Germany; Karl Wilfert, deceased, late of Gerlingen-Waldstadt, Fed. Rep. of Germany, by Dorothea Wilfert nee Rischawy, heir; by Thomas Wilfert, heir, Markgroeningen, Fed. Rep. of Germany

[73] Assignee: Daimler-Benz Aktiengesellschaft, Stuttgart, Fed. Rep. of Germany

[21] Appl. No.: 718,764

[22] Filed: Aug. 30, 1976

[30] Foreign Application Priority Data

Aug. 30, 1975 [DE] Fed. Rep. of Germany ....... 2538700

[51] Int. Cl.² .............................................. B60T 9/10
[52] U.S. Cl. ................................ 303/113; 188/181 T; 303/117; 303/119
[58] Field of Search .................... 188/135, 140 R, 141, 188/181 T; 303/112, 113, 116, 117, 119

[56] References Cited

U.S. PATENT DOCUMENTS

| 2,736,395 | 2/1956 | Keeler, Jr. | 188/181 T |
|---|---|---|---|
| 2,868,338 | 1/1959 | Lucien et al. | 303/113 X |
| 2,999,567 | 9/1961 | Adams | 188/181 T |
| 3,744,852 | 7/1973 | Riordan | 303/117 X |
| 3,754,794 | 8/1973 | Durand | 188/181 R X |

FOREIGN PATENT DOCUMENTS 1,153,451  10/1957  France ............................. 303/113

*Primary Examiner*—George E. A. Halvosa
*Attorney, Agent, or Firm*—Craig & Antonelli

[57] ABSTRACT

Wheel brake apparatus including a brake lining which is moveable into and out of engagement with a brake drum or break disk of a vehicle wheel to be braked. A measuring element is provided for detecting relative movement between the brake lining and the drum or disk. The brake lining is moved by way of a wheel brake piston acted upon by a pressure medium. In order to prevent a lock up of the brake, a controller piston is provided for controlling pressure medium flow to the brake piston in response to the detection of no relative movement between the brake lining and the brake disk or drum, which in turn corresponds to a complete braking action. In preferred embodiments, the controller piston controls a vent line communicating with the front and back of a braking control piston interposed between a master cylinder and the brake lining.

13 Claims, 5 Drawing Figures

4,099,792

BRAKE FORCE CONTROLLER FOR VEHICLES, PARTICULARLY AUTOMOTIVE VEHICLES

BACKGROUND AND SUMMARY OF THE INVENTION

This invention relates to a lock-up preventing brake force controller for vehicles, particularly for automotive vehicles, wherein the pressure medium can be supplied from a pedal-operated master brake cylinder to the operating cylinders on the wheel brakes.

Anti-lock regulators have been known which operate in most cases with the aid of electronic components, whereby the safe functioning of these arrangements is, under certain circumstances, rendered questionable. The invention contemplates providing a brake force controller of a mechanical type having a simple kind of construction, which is safe in operation and which readily ensures the continuation of the braking process even if the controller has failed.

In accordance with this invention, means are provided for ensuring that the resultant brake pressure on the operating piston in the operating cylinders of the wheel brakes can be controlled by means of a control element in dependence on the relative movement between the brake lining and the brake disks or brake drums detected by a measuring element. In this connection, a solution is preferred according to which a control piston is arranged between the master brake cylinder and each wheel brake, the front face of this control piston being exposable to the pressure in the master brake cylinder and the rear face of this control piston being in communication with the front face thereof by way of a communicating connection, with a control element disposed in said communicating connection for controlling flow therethrough in dependence on the relative movement of the brake lining and brake disks or drums.

Thus, the invention proceeds quite generally along the lines of producing the operating force for the brakes by a more or less bilateral exposure of the control piston to the pressure determined in the master brake cylinder, and therefore also controlling such operating force. The relative movement between the brake disk or brake drum and the brake lining serves as the measuring element, in this connection. This method can be accomplished in a technically simple and functionally safe manner and does not give rise to any objections. In case the control mechanism fails, there will always exist a contact force on the brake due to the difference in surface area at the control piston, so that the braking effect will be retained in any event.

A further simplification of the proposed system is achieved by a preferred embodiment of the invention according to which the operating piston provided in the wheel brake cylinder constitutes itself simultaneously the control piston, and according to which the connecting lines from the spaces on its front and rear faces terminate in a cylinder on either side of a piston provided as the control element and having an axial bore passing therethrough. Thus, the arrangement here is such that the control element, in its central position, frees the connection between the two piston sides, optionally under a corresponding throttling action, i.e., releases the brake and, when deviating from this central position toward one of the two sides, blocks this connection, i.e., makes it possible to actuate the brake. This blockage is effected in both directions of rotation of the brake disk or the brake drum. It is then furthermore suggested that the space on the front face of the control piston and the space on the rear face thereof are connected by means of respectively one line under throttling action with a compensating vessel, and that the throttling of the line on the front side is stronger than that of the line on the rear side.

In another preferred embodiment according to this invention, the control piston is fashioned as a special differential piston, the large piston area of which is exposed to the pressure from the master brake cylinder and the small piston area of which serves to supply pressure to the wheel brake cylinder, and wherein the space accommodating the differential piston area is connected via the adjusting element with the space accommodating the large piston area, as well as by way of a throttle valve with a brake fluid container. By an appropriate choice of the area proportion, a servo effect can here be attained at the same time. In general, the adjusting member will be fashioned and/or operated in the same way as in the the preferred embodiment mentioned hereinabove. However, a two-edge control operation can also be introduced by constructing, according to a further suggestion of the invention, the adjusting member as a dual piston, the first piston section of which regulates the bypass line and the second piston section of which regulates the line to the brake fluid container so that the former is open if the latter is closed, and vice versa.

As for the construction of the measuring element, the invention proposes to place a lever serving as the measuring element in frictional contact with each brake drum or brake disk, this lever being held resiliently in its central position and acting on the adjusting element directly or by means of a solenoid. The lever can directly engage the piston rod of the adjusting control piston. It is also contemplated to fashion the measuring element as a switch which actuates a solenoid in the release position. Also other sequence-type follow-up arrangements are suitable in this connection.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
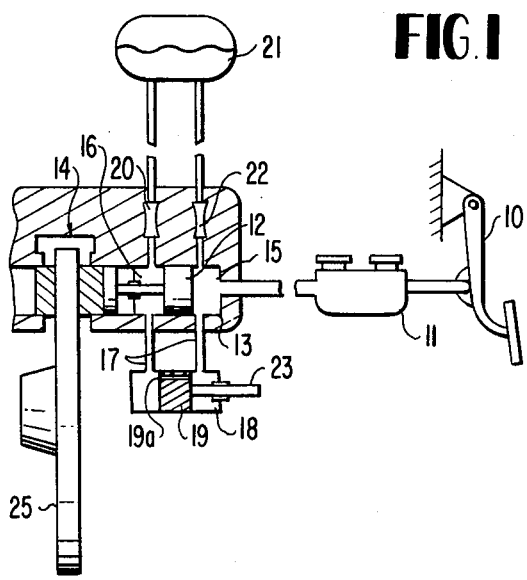
FIG. 1 is a schematic part-sectional lateral view of a first embodiment of the present invention.

Throughout the various views, like reference numerals are used to designate similar structure.

Figure 2:
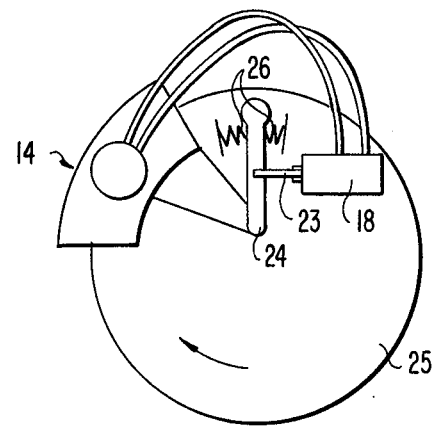
FIG. 2 is a schematic view taken at right angles to FIG. 1 and showing the embodiment according to FIG. 1.

According to FIGS. 1 and 2, when brake pedal 10 is actuated, control piston 12 in wheel brake cylinder 13 of each wheel brake is acted on in the usual manner by way of master brake cylinder 11. By way of the control piston 12, disk brake 14 of the respective wheel is then applied, again in the usual manner. The disk brake itself can be of a conventional construction.

The control piston 12 is fashioned as a double-acting piston, and brake pressure chamber 15 on its front side is in communication by way of a conduit 17 with counter pressure chamber 16 on its rear side; the conduit 17 being communicated by way of a cylinder 18 wherein an adjusting piston 19 is arranged. The two conduit sections 17 terminate on respective sides of the adjusting piston 19. Piston 19 is provided with a bore 19a so that, in the illustrated central position, the brake pressure chamber 15 is in communication with the counter pressure chamber 16. The counter pressure chamber 16 is connected by way of a throttle valve 20 with a compensating vessel 21, which latter is also in communication with the brake pressure chamber 15 by way of another, narrower throttle valve 22. The piston rod 23 of the adjusting piston 19 engages, as shown in FIG. 2, a lever 24 pivotably mounted to the brake anchor plate about the axis of the brake disk and being in frictional contact, as the measuring element, with the brake disk 25. By means of springs 26, the lever 24 is held in its central position, from which it is entrained upon the rotation of the disk in dependence on the direction of rotation of the disk.

Thus, when the brake disk 25 is rotated during the normal driving operation, the lever 24 is in one of its swung-out end positions, and thus the adjusting piston 19 is likewise in one of its end positions. Therefore, the connecting line 17 is blocked thereby, so that the pedal 10 can be used quite normally for braking purposes in this position. If now, during the braking operation, the brake locks, i.e., the disk 25 is arrested, then the lever 24 returns to its central position, and the adjusting piston 19 releases the connection 17 in the illustrated central position, so that the brake can be released by a pressure buildup in the counter pressure chamber 16.

Once the wheel begins to rotate again, the lever 24 is pivoted out of its position again, and the piston 19 blocks the connection once more. During this process, the pressure in the counter pressure chamber 16 is reduced via the throttle 20 into the compensating vessel 21, so that the braking function can return. After the braking step, the brake fluid passes from the compensating tank 21 via the narrower throttle 22 back into the cycle.

Figure 3:
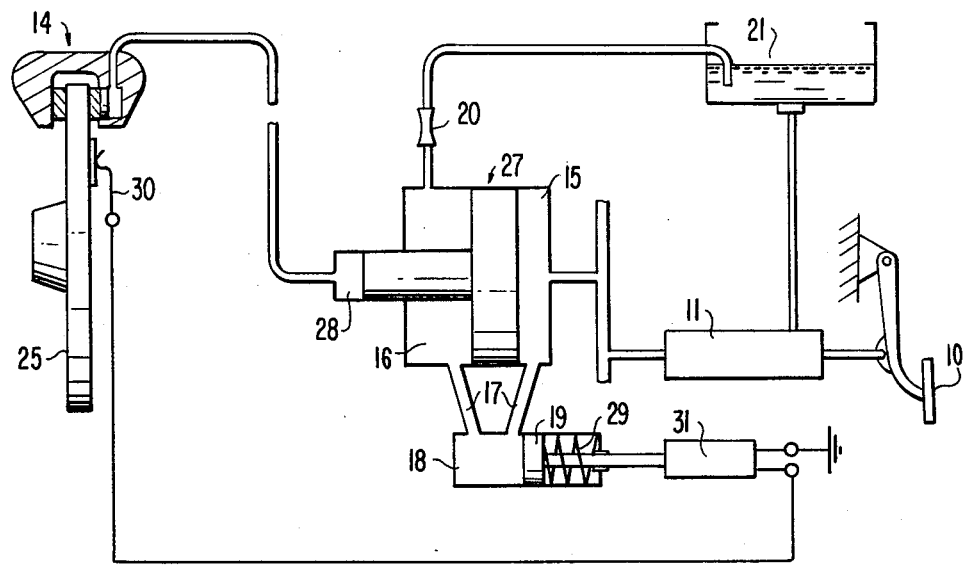
FIG. 3 is a schematic part-sectional lateral view of another embodiment of the present invention.

According to FIG. 3, a special differential piston 27 as the control piston is inserted between the master brake cylinder 11 and each wheel brake cylinder at the disk brake 14. The large piston area of this differential piston 27 is associated with the brake pressure chamber 15, the differential piston area is associated with the counter pressure chamber 16, and the small piston area is associated with the chamber 28 to produce the pressure on the wheel brake 14. The chambers 15 and 16 can, in turn, be connected by way of the conduits 17 terminating in the cylinder 18 wherein an adjusting piston 19 is arranged which is normally held in its blocking position by means of a spring 29. In this blocking position, the brake can be operated quite normally. If the wheel locks, then a switch 30 is closed at the measuring element, closing the circuit of the solenoid 31. The latter then pulls the adjusting piston 19 into the illustrated release position, so that the brake pressure is now lowered, by a connection of the chambers 15 and 16 via the conduits 17, to a value corresponding to the area proportion. Otherwise, the procedure takes place exactly as in the embodiment of FIGS. 1 and 2.

Figure 4:
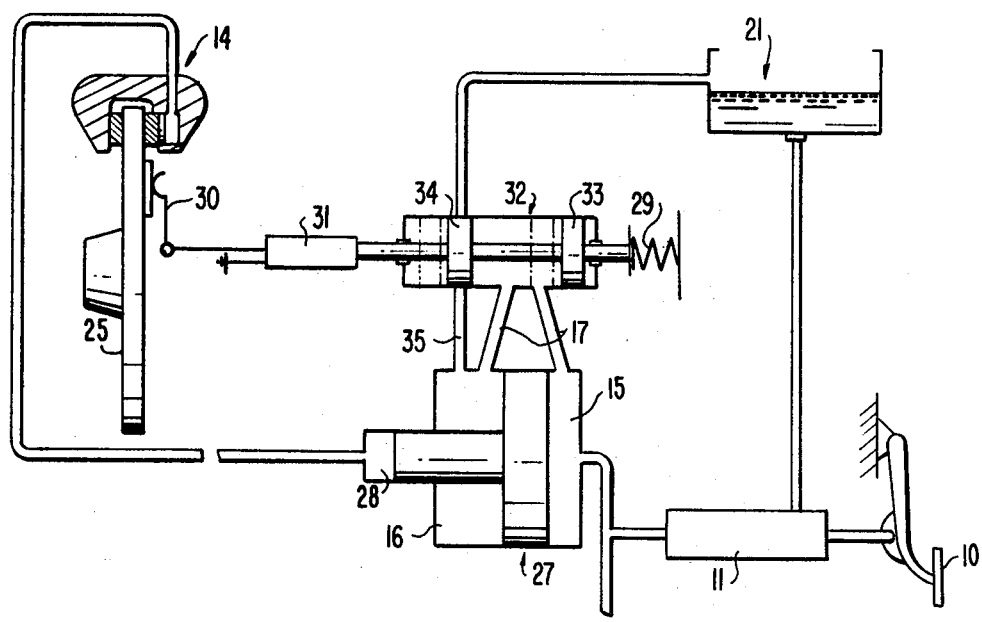
FIG. 4 is a schematic part-sectional lateral view of a third embodiment of the present invention.

According to FIG. 4, the total arrangement and also the structure at the differential piston 27 is as described above. However, the adjusting piston 32 in this case has two piston sections, the first section 33 of which controls the connecting line 17, while the second piston section 34 controls an additional conduit 35 connecting the counter pressure chamber 16 with the compensating vessel 21. This provides a two-edge control wherein the spring 29 maintains the adjusting piston 32, with the wheels rotating, in such a position that the first piston section 33 blocks the connection 17 whereas the second piston section 34 frees the conduit 35. In this position, a normal braking step can be carried out. If the wheel locks, then, in a manner already described above, the adjusting piston 32 is placed in the illustrated position by means of the solenoid 31, and the brake pressure is more or less lowered in a way set forth above.

Figure 5:
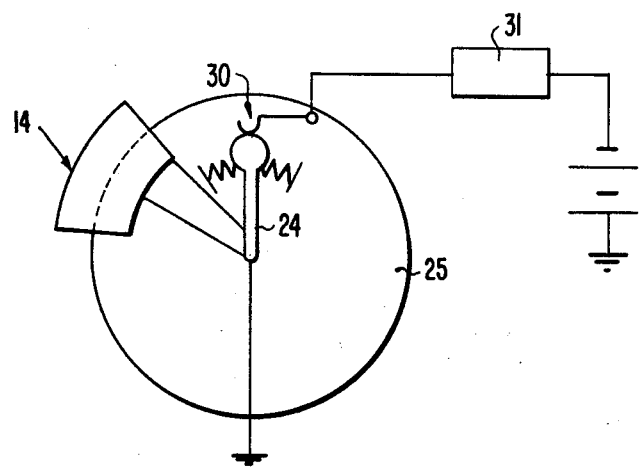
FIG. 5 shows another measuring element arrangement, according to the present invention, in a schematic view.

According to FIG. 5, the switch 30 is associated with the lever 24 so that the contact is closed and the solenoid 31 excited only in the central position, i.e., when the wheel is arrested. The lever 24 pivots in both directions of rotation, and the excitation is interrupted. In these two positions, then, the adjusting piston 19 or 32 is in each case in its blocking position.

The measuring element can consist, for example, also of a permanent magnet which, without contact, converts the rotary movement of the brake disk or the brake drum into a shifting movement of the adjusting piston. In case the wheel does not rotate, it is also contemplated to provide a spring to return the measuring element and thus the adjusting element to its zero position.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:
1. Wheel brake apparatus comprising:
a pedal-operated master brake cylinder,
brake lining means engageable with a moveable part of a wheel for applying braking forces thereto from said master brake cylinder,
measuring element means for detecting relative movement between said brake lining means and said moveable part,
wheel brake piston means acted upon by a pressure medium supplied by said master brake cylinder and operatively connected with said brake lining means for forcing said brake lining means toward said moveable part in response to a predetermined force on said wheel brake piston means by said pressure medium,
a brake force lock-up preventing controller for automatically changing said predetermined force by said pressure medium in response to the relative movement detected by said measuring element means,
a control piston provided between the master brake cylinder and the wheel brake piston means, the front face of this control piston being exposed to the pressure output of the master brake cylinder, at least portions of the rear face of the control piston being exposed to the pressure acting on the wheel brake piston means, connection means separate from said control piston for communicating the pressure at said front face directly with said rear face through said lock-up preventing controller, said connection means bypassing the master brake cylinder, and only a single adjusting piston member means, arranged in said lock-up preventing controller, for controlling flow through said connection means.

2. Apparatus according to claim 1, wherein said controller includes spring means for reducing the force by said pressure medium in response to the detection of no relative movement between said brake lining means and said moveable part.

3. Apparatus according to claim 2, wherein a lever serving as the measuring element is in frictional contact with each movable part, said movable part being one of a brake drum and a brake disk, this lever being held resiliently in its central position and acting on the control element directly or by way of a solenoid.

4. Apparatus according to claim 1, wherein the wheel brake piston means forms itself simultaneously the control piston, and wherein the single piston member means provided in the controller has a bore passing therethrough.

5. Apparatus according to claim 4, wherein the control piston is fashioned as a differential piston, the large piston area of which is exposed to the pressure in a brake pressure chamber from the master brake cylinder, the small piston area of which serves for acting on a wheel brake cylinder, and wherein the counter pressure chamber accommodating the differential piston area is connected via the controller with the brake pressure chamber as well as, by way of a throttle valve, with a compensating vessel.

6. Apparatus according to claim 1, wherein a brake pressure chamber on the front side of the control piston and a counter pressure chamber on the rear side thereof are in communication, via respectively one throttled conduit, with a compensating vessel and wherein the throttling in the conduit of the brake pressure chamber is greater than the throttling in the conduit of the counter pressure chamber.

7. Apparatus according to claim 6, wherein the single adjusting piston member means has a bore extending therethrough for equalizing the position thereof during normal driving operations with said single adjusting piston member means in a central position.

8. Apparatus according to claim 1, wherein the control piston is fashioned as a differential piston, the large piston area of which is exposed to the pressure in a brake pressure chamber from the master brake cylinder, the small piston area of which serves for acting on a wheel brake cylinder, and wherein the counter pressure chamber accommodating the differential piston area is connected via the controller with the brake pressure chamber as well as, by way of a throttle valve, with a compensating vessel.

9. Apparatus according to claim 8, wherein the controller is fashioned as a double-acting piston, the first piston section of which controls a bypass line forming said pressure communicating connection means and the second piston section of which controls a conduit to pressure medium acting on the brake lining means in such a manner that the former is open if the latter is closed, and vice versa.

10. Apparatus according to claim 1, wherein a lever serving as the measuring element means is in frictional contact with each movable part, said movable part being one of a brake drum and a brake disk, this lever being held resiliently in its central position and acting on the controller directly or by way of a solenoid.

11. Apparatus according to claim 1, wherein said pressure communicating connection means includes a first fluid line leading from a space at the front face of the control piston and a second fluid line leading from a space at the rear face of the control piston, and further wherein said single adjusting piston member means is movable to selectively block and communicate said first and second lines with respect to one another.

12. Apparatus according to claim 11, wherein said measuring element means includes a lever member which is attached to said single adjusting piston member means, said lever member being engageable with said movable part so as to move away from a predetermined position against a means for applying a resilient force during relative movement of said movable part with respect to said brake lining means, said resilient force means including spring means to move said lever member to said predetermined position when said movable part is in a stopped condition with respect to said brake lining means, said lever member being operable to move said single adjusting piston member means to a position communicating said first and second lines when said lever member is in said predetermined position.

13. Apparatus according to claim 4, wherein said single adjusting piston member means has a bore extending therethrough for equalizing the position thereof during normal driving operations with said adjusting piston member means in a central position.

* * * * *